June 20, 1939. J. I. CIERPIAL 2,163,023
MEASURING INSTRUMENT
Filed Feb. 6, 1937
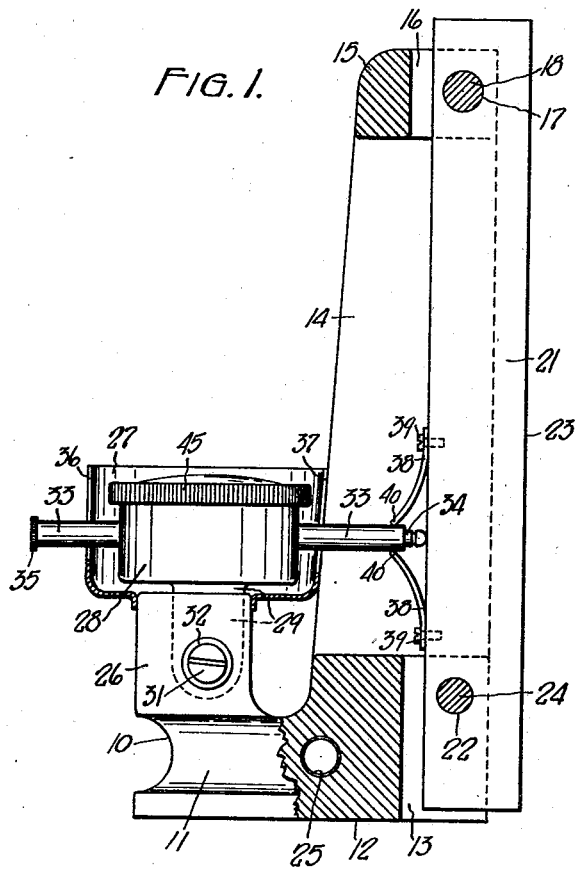
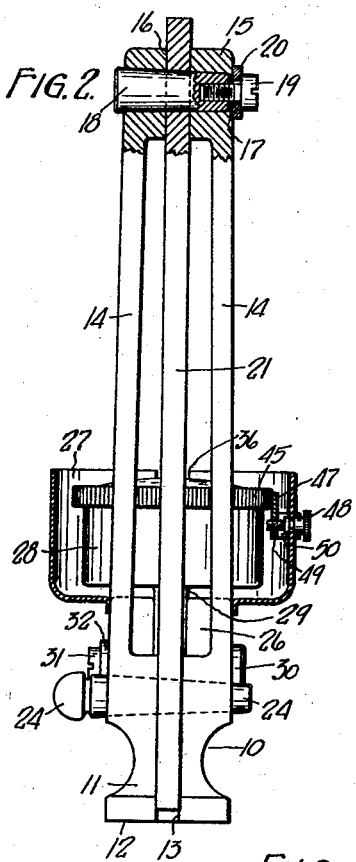
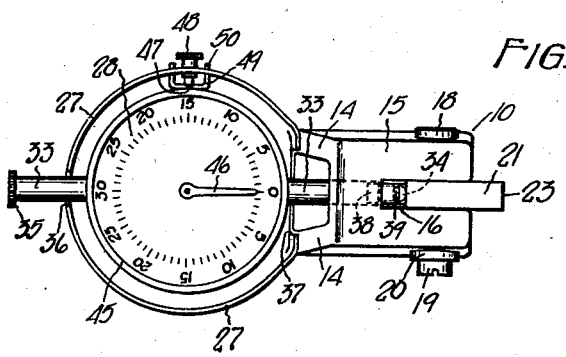
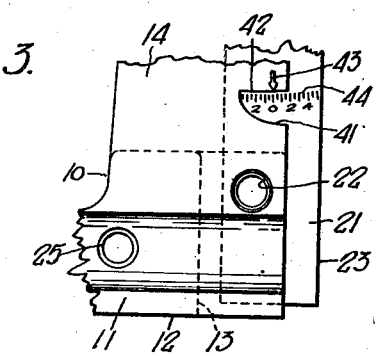
INVENTOR.
JOHN I. CIERPIAL.
BY Oltsch + Knoblock
ATTORNEYS.

Patented June 20, 1939

2,163,023

UNITED STATES PATENT OFFICE 2,163,023

MEASURING INSTRUMENT

John I. Cierpial, Warren Township, St. Joseph County, Ind.

Application February 6, 1937, Serial No. 124,472

12 Claims. (Cl. 33—75)

This invention relates to measuring instruments, and particularly to instruments by which minute variations of the relation of angularly disposed faces from a predetermined angular relation may be readily and accurately determined.

In high precision work, and particularly in the making of tools, dies, jigs and the like, where absolute accuracy is essential, it is highly desirable to determine accurately the amount of error between the state of the work at any time and the desired finished state of the work. This is particularly true with respect to angular faces whose relation must be exact. Furthermore, it is desirable to determine variations of angular relations of faces from a predetermined finished relation in terms of both angular and linear units of measurement. Conventional or known tools, to the best of my knowledge, are inadequate for this purpose. Thus, though tools for measurement of variations in terms of angles are available, the same do not include means for translating that determination in terms of linear measurements, and hence the amount of material to be worked to eliminate the variations can only be approximated. Likewise, tools for measuring in linear terms are difficult to use, require time consuming adjustment for each use, and do not give reading of angles.

It is therefore the primary object of this invention to provide an instrument by which both angular and linear measurement of variations of angular relation of a pair of surfaces from a predetermined relation may be readily made.

A further object is to provide an instrument of this character wherein a linear measuring device is incorporated and is operable in response to operation of angle measuring means.

A further object is to provide a device of this character wherein a linear measuring device is pivotally mounted for operation by angle measuring means which pivot said device to compensate for the angle measured by the last named means.

A further object is to provide a device of this character with means for protecting the highly sensitive portions thereof.

A further object is to provide a device of this character with novel means for locking the parts in stationary inoperative relation when not in use.

Other objects will be apparent from the description and the appended claims.

In the drawing:

Fig. 1 is a view of the device in side elevation with parts shown in section.

Fig. 2 is a view of the device in front elevation with parts shown in section.

Fig. 3 is a top plan view of the device.

Fig. 4 is a fragmentary side view of the device illustrating the character of the angle measuring means.

Referring to the drawing, which illustrates the preferred embodiment of the invention, the numeral 10 designates a frame. Frame 10 is preferably integrally formed and comprises a suitable base 11 having an accurate straight-edge bottom surface 12. The front portion of base 11 is provided with a central longitudinally vertically extending slot 13. From the opposite sides of the front portion of base 11 project vertical arms 14 in outwardly spaced relation to slot 13. Arms 14 are elongated and complementary and may incline slightly inwardly and upwardly. At their upper ends the arms terminate in a cross head 15, and this cross head is provided with a central longitudinal vertical slot 16 in vertically aligned relation to slot 13.

A tapered aperture 17 is formed in the forward portion of head 15 in transverse relation to and communicating with slot 16. The axis of aperture 17 is horizontal. In aperture 17 is mounted a pin 18 tapered in complementary relation to said aperture to accurately fit therein. The small diameter end of said pin 18 is provided with an axial threaded bore in which a machine screw 19 is secured; and a washer 20 is interposed between the head of said screw and the adjacent side wall of head 15. By this construction the pin 18 is securely held in accurate close fitting relation in aperture 17. An elongated control member or blade 21, preferably having parallel front and rear vertical edges, fits closely but freely in the slots 13 and 16 at its ends. Centrally, or intermediately relative to its front and rear edges, and adjacent its upper end, member 21 is provided with a tapered transverse aperture complementary to and registering with aperture 17 through which the central portion of pin 18 spanning slot 16 accurately fits in a manner to permit pivoting of member 21 thereon. The member 21 is positioned to normally project forwardly of the front edge of base 11, arms 14 and head 15 of frame 10 when said member 21 is at right-angles to base surface 12. In vertically aligned parallel relation to aperture 17 and pin 18 the slotted forward portion of base 10 is provided with a tapered aperture 22 communicating with slot 13; and a complementary tapered aperture adapted to register with aperture 22 when said member is at true right-angles to surface 12 is formed in member 21. The right angled relation between member 21 and base surface 12 is, more specifically, the relation between the front vertical guide edge 23 of member 21 and said base surface 12. A tapered pin 24 is adapted to accurately fit in said last named apertures in the base and the control member, whereby to lock said control member 21 with its guide edge 23 in exactly 90 degree angular relation to base surface 12. A suitable tapered aperture 25 is provided in base 11 in rearwardly spaced relation to slot 13 to receive pin 24 whenever the pin is not in use to lock member 21.

From the upper side of base 11 in rearwardly spaced relation to arms 14 project a pair of spaced vertical parallel flanges 26 which are parallel to the side edges of control member 21. On the upper ends of these flanges 26 is secured a substantially cup-shaped guard 27 which is open at its upper end. Within the guard 27, and spaced for normally free movement independent of said guard, is a conventional indicator 28 of the type for accurately indicating linear measurements in thousandths or other desired fractions of an inch. Centrally from the bottom of the housing of indicator 28 a tongue 29 extends downwardly, and this tongue 29 is pivoted between flanges 24 by a tapered pin 30 whose axis is horizontal and parallel to the axis of pin 18. The pin 30 is of the same construction as pin 18 and is locked in place by a machine screw 31 threaded thereto and having its head bearing on a washer 32 in the same manner as hereinbefore described with respect to pin 18 and associated parts.

The indicator 28 has a fixed sleeve 33 projecting from opposite sides thereof in which is mounted a spring pressed reciprocable plunger 34. The sleeve 33 projects forwardly between the frame arms 14 and the plunger 34 engages the rear edge of control member 21 intermediate the ends thereof. The diametrically opposed or rear projecting portion of sleeve 33 may mount an adjusting head 35 for adjusting plunger 34. A suitable vertical slot 36 is provided in guard 27 to accommodate free passage of the rear portion of sleeve 33 to accommodate positioning of adjusting head 35 exteriorly of said guard. The guard 27 is open at its front to permit free movement of the front projecting portion of sleeve 33.

A pair of opposed elongated leaf springs 38 are secured at 39 to control member 21 at its rear edge and in equally spaced relation to the normal horizontal position of said indicator plunger and sleeve when said control member is in accurate vertical position. The adjacent end portions 40 of springs 38 are rearwardly bent in complementary relation and bear upon the sleeve 33 in diametrically opposed relation and at points equally spaced from the end thereof.

One of the frame arms 14 is provided with a recess or cut-away 41 at its lower end and adjacent base 11. This recess has its upper edge 42 curved in an arc about the axis of pin 18 as a center. Juxtaposed to this recess and to edge 42, and preferably integrally formed with arm 14, is an arrow or pointer 43. On the control blade 21 juxtaposed to edge 42 and arrow 43 and visible through recess 41, is an arcuate scale 44 having angular indicia thereon calibrated accurately with respect to the radius between it and the axis of pin 18. It will be observed that this radius is large, and therefore permits said indicia to include also indications of small subdivisions of angles, as minutes and seconds, relative to a "zero" point which is aligned with arrow 43 when the control member 21 is positioned with its edge 23 in exact 90 degree relation to base surface 12.

Indicator 28 is preferably of the type having a rotatable dial mounting rim 45 whose outer periphery projects from the indicator housing and is knurled. By rotation of rim 45 the dial of the indicator can be adjusted as desired relative to the shiftable hand or pointer 46 of the indicator. When this adjustment is effected, it can be maintained by a member 47 urged into engagement with knurled surface of rim 45 by a set screw 48 carried by guard 27. In one embodiment, as illustrated, the locking member 47 is mounted by a U-shaped member 49 whose parallel arms 50 pass through suitable guide apertures in the guard 27 and thus guide the member 47 in substantially radial movement in connection with shifting of set screw 48 to permit said member to engage dial rim 45 only upon proper adjustment of said set screw.

In use, the instrument is mounted or placed on a conventional surface plate whose mounting surface is absolutely plane. The work is positioned on said plate adjacent the instrument whereby the guide face 23 of control member 21 may be positioned in full face engagement with the surface to be measured. For this purpose, the locking pin 24 is removed from aperture 22 and preferably inserted in the aperture 25. The spring pressure on the indicator plunger 34 is sufficient to urge the same outwardly when the control member 21 is outwardly pivoted. Thus, by firmly seating both the instrument and work on the bearing plate, and juxtaposing the same so that the control member may be swung into position with its edge 23 in full face engagement with the surface of the work to be measured, the desired measurements can be directly obtained. The angular measurement of the face in question is obtained by reading of scale 44 at the point to which pointer 43 directs; and the linear measurement is automatically read upon the dial of the indicator. It will be understood that the linear measurement obtained from the dial reading is the measure per the known unit of length determined by the spacing of the point of engagement of plunger 34 from the horizontal plane in which the axis of pivot pin 18 lies. The operator can readily determine the linear variation of the work as a whole by determining the ratio of the pertinent dimension of the work to the predetermined unit dimension of the instrument, and then applying this ratio to the reading per predetermined unit as read on the indicator dial. It will be seen that the use of such a predetermined unit measurement requires accurate adjustment of the angular position of the indicator coincident to swinging movement of the control member. This is provided automatically in the device by the spring members 38 which serve to pivot the indicator through engagement with its sleeve 33, and thereby insure engagement of plunger with control member at a predetermined point.

Where the angle of the face of the work to be measured varies from 90 degrees, the work may be positioned on a block or shim of exactly the angle desired, the instrument, of course, remaining solely on the bearing plate; and the measurement then obtained in the same manner heretofore described.

It will readily be appreciated that this device enables a workman to readily and accurately determine whether any variation between the angles existing and desired exists in a given piece of work, and to determine the same in both angular and linear measurement. These readings can be obtained simply and without difficult manipulations or adjustments; and when obtained constitute an accurate basis for determining the extent to which finishing work must be carried to arrive at the desired finished angular condition.

When the device is not in use, the locking pin may be inserted in apertures 24 of the frame and the blade aperture registering therewith to prevent maladjustment and damage of parts in handling. Furthermore, pin 24 may be inserted to lock the member accurately in 90 degree relation to the base for use as a conventional square when the variation is exceedingly slight. It will also be observed that the pin 24, by locking the control 21 against movement relative to frame 10, also holds the members 38 stationary; and thereby prevents tilting of the indicator 28 relative to the frame.

The locking member 47, when engaging the rim 45 of the indicator, also serves to lock the indicator against tilting, in addition to its primary function of holding the indicator dial in desired position relative to the normal adjustment of the indicator pointer 46.

I claim:—

1. In a measuring instrument, a frame, a member pivoted to said frame on a fixed axis, and an indicator pivoted on said frame having an operating part spring pressed against said member, and means on said member for positioning said part in predetermined relation thereto.

2. In a measuring instrument, a frame, a member pivoted to said frame, an indicator pivoted to said frame and actuated by said member, and means carried by said member for positioning said indicator in predetermined relation to said member.

3. In a measuring instrument, a frame, a member pivoted to said frame, an indicator pivoted to said frame on an axis parallel to the pivot axis of said member and engaging said member, and means for maintaining the engagement of said indicator and member in predetermined relation.

4. In a measuring instrument, a frame, a member pivoted to said frame, an indicator pivoted to said frame and including an actuating part energized by said member, and opposed resilient guides carried by said member and engaging said part to position said part relative to said member.

5. In a measuring instrument, a base, a pair of spaced arms projecting upwardly from said base, a vertical blade between said arms and pivoted to the upper ends thereof, an ear projecting upwardly from said base in rearwardly spaced relation to said arms, an indicator pivoted to said ear about an axis parallel to the pivot axis of said blade, and a substantially horizontal reciprocable actuator carried by said indicator and extending between said arms into spring pressed engagement with the said blade.

6. In a measuring instrument, a frame, a substantially vertical blade pivoted to said frame, an indicator pivoted to said frame about an axis parallel to the pivot axis of said blade, a substantially horizontally extending sleeve projecting from said indicator and terminating adjacent said blade, a spring pressed plunger for actuating said indicator, said plunger projecting from the end of said sleeve into engagement with said blade, and a pair of elongated springs carried by said blade in spaced opposed relation to said plunger and bearing on opposite sides of said sleeve.

7. In a measuring instrument, a frame, a blade shiftably carried by said frame, a guard carried by said frame and having an opening adjacent said blade, an indicator pivoted to said frame within said guard, an actuator carried by said indicator projecting freely through said opening and actuated by shifting of said blade relative to said base, and means carried by said blade and positioning said actuator relative to said blade.

8. In a measuring instrument, a frame, a blade shiftably carried by said frame, an indicator pivoted on said frame in spaced relation to said blade and including an actuator projecting therefrom into engagement with said blade, and a stationary guard on said frame encompassing said indicator and having an opening therein through which said actuator projects.

9. In a measuring instrument, a frame, a blade pivoted to said frame, an indicator pivoted to said frame and including a projecting actuator engaging said blade, means carried by said blade and engaging said actuator to position said actuator relative to said blade, and means for locking said blade against pivotal movement, said indicator being locked against pivotal movement by said blade-carried and locking means.

10. In a measuring instrument, a frame, an indicator carried by said frame and having a rotatable adjusting rim, a guard carried by said frame and encompassing said indicator, and means carried by said guard for locking said rim against rotation.

11. In a measuring instrument, a frame, an indicator mounted on said frame and having a shiftable adjusting part, a guard mounted on said frame and encompassing said indicator in spaced relation thereto, and means carried by said guard and engaging said part to lock said part in stationary relation to said indicator.

12. In a measuring instrument, a frame, an indicator mounted on said frame and having a shiftable adjusting part, a guard mounted on said frame and encompassing said indicator in spaced relation thereto, a member shiftably carried by said indicator adjacent said part, and means for shifting said member into locking engagement with said part.

JOHN I. CIERPIAL.